Sept. 12, 1933.    R. M. WOYTYCH    1,926,358
TAILSTOCK CLAMPING MECHANISM
Filed Dec. 19, 1931    2 Sheets-Sheet 2
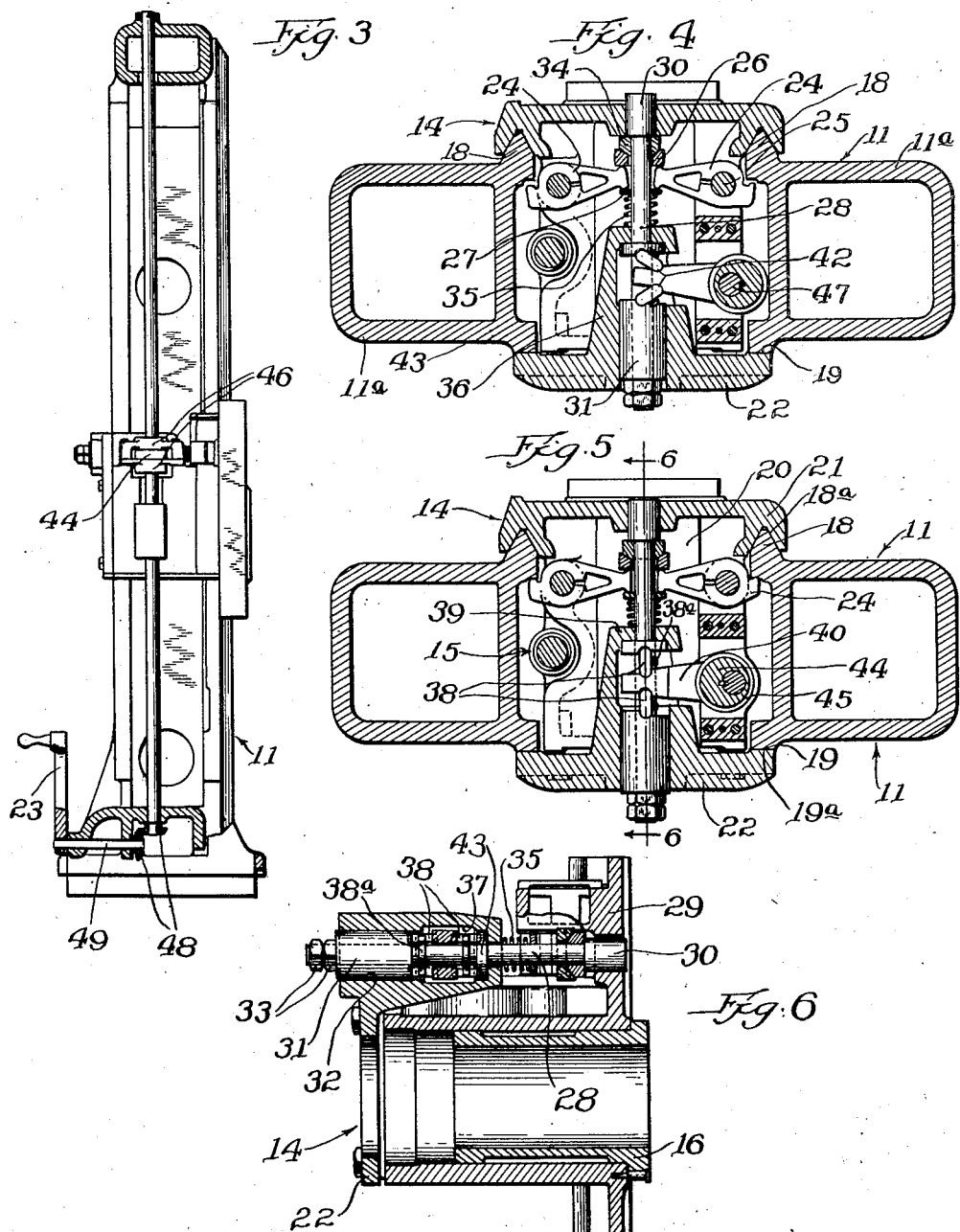

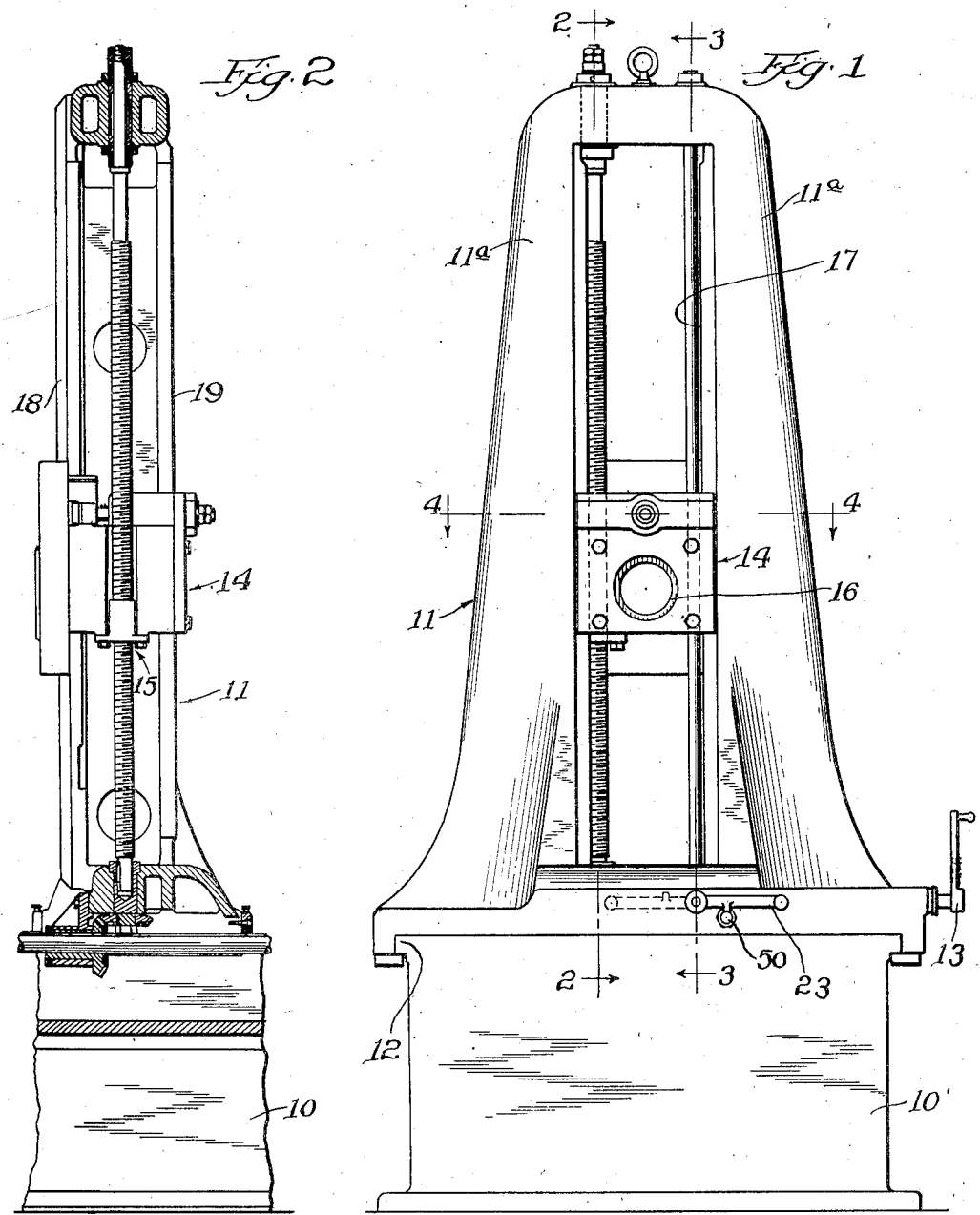

Patented Sept. 12, 1933

1,926,358

UNITED STATES PATENT OFFICE 1,926,358

TAILSTOCK CLAMPING MECHANISM

Raymond M. Woytych, Fond du Lac, Wis., assignor to Giddings & Lewis Machine Tool Co., Fond du Lac, Wis., a corporation of Wisconsin Application December 19, 1931
Serial No. 582,052

16 Claims. (Cl. 29—26)

The invention relates generally to the type of machine tool commonly known as a horizontal boring, drilling and milling machine, and more particularly to a clamping mechanism for securing the vertically adjustable tailstock of such a machine in any desired vertical position.

Such machines are commonly constructed in quite large sizes providing a considerable range of vertical adjustment of the tailstock upon the upstanding tailstock support, and the primary object of the present invention is to provide a novel and improved clamping mechanism adapted to secure the tailstock in any adjusted position on the support and operable by an actuator assembly located at the base of the support.

Another object is to provide such a clamping mechanism having an improved power multiplying mechanism between the operating means and the clamp.

Other objects and advantages will become apparent from the following description taken in connection with the accompanying drawings which illustrate the preferred embodiment of the invention and in which:

Figure 1 is an elevational view showing the tailstock end of a horizontal boring, drilling and milling machine embodying the invention.

Fig. 2 is a fragmental vertical sectional view taken along the line 2—2 of Fig. 1.

Fig. 3 is a fragmental vertical sectional view taken along the line 3—3 of Fig. 1.

Fig. 4 is a sectional view taken along the line 4—4 of Fig. 1 and showing the clamping mechanism in its released position.

Fig. 5 is a view similar to Fig. 4 showing the clamping mechanism in its operative clamped position.

Fig. 6 is a vertical sectional view taken along line 6—6 of Fig. 5 and showing the vertically movable tailstock and the details of a portion of the clamp-actuating means.

For the purpose of disclosure the invention in its preferred form is herein illustrated in association with the bed 10 of a horizontal boring, drilling and milling machine of the type illustrated in a copending application by Keith F. Gallimore, Serial No. 442,055 filed April 7, 1930 (Patent No. 1,858,491). As illustrated in said application, an upstanding tailstock support or column 11 is mounted on one end of the bed 10 for manual adjustment longitudinally thereof along horizontal ways 12, such movement being obtained by a traverse handle 13, and suitable clamping means (not shown) is provided for securing the column 11 in adjusted position on the bed.

Vertically slidable on the column 11 is a tailstock 14, preferably actuated in its vertical movement by a screw and nut device 15 so as to move in unison with the headstock (not shown), and carrying a sleeve 16 adapted to receive and support the tailstock end of an arbor (not shown) to be used in boring and milling operations.

Preferably the column 11 is formed with a vertical space 17 extending substantially from the top to the bottom thereof so as to form spaced parallel standards 11$^a$, and the tailstock 14 is mounted for vertical movement in the space 17 along oppositely facing ways 18 and 19 formed on the adjacent corners of the side standards 11$^a$. In the present instance, the ways 18 on the one side of the column 11 are of a projecting V-shape as shown in Figs. 4 and 5 and are engaged by complemental guideways 18$^a$ on the tailstock 14, while the ways 19 are in the form of flat bearing surfaces opposed and engaged by flat surfaces 19$^a$ on the tailstock. The tailstock is formed by a block 20, one end of which is flanged at 21 to provide the guideways 18$^a$, and upon the other end of the block 20 a plate 22 is removably bolted to provide the surfaces 19$^a$ and confine the tailstock slidably on the column 11.

Means is provided for releasably clamping the tailstock 14 in any desired position of vertical adjustment along the column 11 and this clamping means is operable through the medium of a handle 23 (Figs. 1 and 3) located for convenient manipulation at the base of the column 11. The preferred form of clamping means is best illustrated in Figs. 4 to 6 and comprises a pair of clamp levers 24 pivoted on two vertical rods 25 mounted on opposite sides of the block 20 so that one end of each lever is movable into engagement with the inner face of one of the guides 18 in opposed relation to the guideways 18$^a$. The other ends of the clamping levers 24 extend toward each other across the top of the block 20 and between two collars 26 and 27 freely disposed on a longitudinally movable horizontal clamp rod 28. The clamp rod 28 is mounted for sliding movement in the tailstock transversely thereof and parallel to the axis of the sleeve 16, and at its opposite ends is supported for longitudinal sliding movement by the block 20 and the plate 22. The slidable support on the block 20 is provided by an upstanding plate-like portion 29 (Fig. 6) through which an enlarged end 30 of the rod 28 extends. At its other end the rod 28 extends through a sleeve 31 which is slidable in a bore 32 formed in the plate 22, nuts 33 being provided on the end of the rod 28 to hold the sleeve 31 in position thereon.

When the rod 28 is actuated to clamp the tailstock in position, the movement is transmitted to the levers 24 by the collar 26 which is shiftably mounted on the rod with a concave seat engaging a complemental convex surface on a washer 34 interposed between the collar 26 and the abutment formed by the enlarged end 30 of the clamp rod 28. To hold the collar 27 against the levers 24, whereby to maintain the parts in operative relation and unclamp the levers 24 when the rod is released, an expansive coil spring 35 surrounds the rod 28 between the collar 27 and the end of a hub 36 which projects from the plate 22 along the top of the block 20 and in surrounding relation to the clamp rod 28 and the sleeve 31.

Actuating force to move the clamp rod 28 against the spring 35 is applied by the remotely located handle 23 through the medium of power multiplying means which is preferably of the toggle type. In the present case, the hub 36 has a recess 37 (Figs. 4, 5 and 6) formed therein spaced from the end of the hub and opening horizontally through the side of the hub so as to receive the toggle means. Sufficient space is provided in the recess 37 as shown in Fig. 6 to receive two pairs of toggle links 38, one above and the other below the rod 28, and the toggle links when extended act between the end wall 39 of the hub 36 and the end of the sleeve 31 to draw the clamp rod 28 against the clamp-releasing action of the spring 35. To facilitate assembly of the device and maintain the parts in proper relation, the corresponding upper and lower toggle links 38 are preferably connected by arcuately formed straps 38a as shown in Figs. 4 to 6. To actuate the toggle links 38, a bifurcated arm 40 extends into the recess 37 and straddles the rod 28 and the adjacent rounded ends of the links 38 are positioned in seats 42 formed in opposite sides of the legs of the arm 40. Similar seats are formed in the end of the sleeve 31 to receive the rounded ends of the adjacent toggle links, while a washer 43 seated against the wall 39 of the hub has similar seats formed therein for the other toggle links 38.

Thus, in movement of the arm 40 inwardly of the recess 37 from the position shown in Fig. 4 to the position shown in Fig. 5, the toggles are extended and the clamp rod 28 is moved to apply clamping pressure to the clamp levers 24, and upon withdrawal of the arm 40 the rod 28 and the clamp levers 24 are returned to their released positions by the spring 35.

Since the toggles 38 act between the rod 28 and the plate 22, it will be seen that the actuation of the toggles serves also to clamp the plate 22 against the ways 19 whereby a double clamping of the tailstock is obtained.

Such actuating movement of the arm 40 is preferably obtained by an eccentric 44 which is encircled by an annular bearing 45 formed on the arm 40. The eccentric 44 is mounted between upper and lower bearings 46 (Fig. 3) fixed on the block 20 so as to move vertically therewith, and it has a sliding keyed connection with a vertical shaft 47 so as to permit of vertical movement of the eccentric with the headstock.

As shown in Fig. 3, the vertical shaft 47 is journaled in the column 11, and at its lower end is operatively connected by bevel gears 48 to a horizontal shaft 49 which carries the handle 23. In Fig. 1, the full line position of the handle 23 corresponds to the unclamped position of the parts shown in Fig. 4 of the drawings, this position being determined by a stop 50.

To clamp the tailstock, the handle 23 is rotated, from the position shown in full lines, in a counter-clockwise direction (Fig. 1) toward the position shown in dotted outline, whereby to rotate the shaft 47 in a clockwise direction from the position of Fig. 4 to that of Fig. 5. The extent of movement of the handle 23 in a counter-clockwise or clamping direction is, of course, dependent upon the adjustment of the nuts 33, but it is to be noted that the clamped position of the handle is of secondary importance as compared to the final or clamped positions of the eccentric and the toggles.

The preferred relation of the toggles and the eccentric is shown in Fig. 5 wherein the eccentric has moved the arm the maximum amount to the left, so that the toggles 38 are fully extended. This relation may be obtained by adjustment of the nuts 33, and it is such that there is no tendency for the toggles and the eccentric to be moved to their other or clamp-releasing positions. Hence the clamp levers 24 are locked in their active positions through the cooperative action of the toggles and the eccentric.

I claim as my invention:

1. In a tailstock construction having a column and a tailstock slidable vertically on said column, a clamping element on said tailstock for engaging said column, an operating handle at the bottom of said column, movable means on said column actuated by said handle and extending vertically along the path of movement of said tailstock, and an operating connection between said movable means and said element operable in any vertical position of the tailstock to clamp said element upon movement of said means in one direction, said connection including a toggle arranged to be moved into its extended position to clamp said element.

2. In a tailstock construction having an upstanding column and a tailstock mounted for vertical sliding movement thereon, the combination of clamping elements mounted on the tailstock for vertical movement therewith, a vertical shaft rotatably mounted in said column, an eccentric mounted in said tailstock for vertical movement therewith and having a sliding non-rotatable connection with said shaft, and toggle means carried by said tailstock operable to clamp said elements and actuated by said eccentric.

3. In a machine tool having an elongated support, a member mounted for longitudinal sliding movement along said support, a clamping element carried by said member for securing said member in adjusted position on said support, an operating means positioned at one end of said support, a shaft rotatably mounted in said support parallel to the path of movement of said member and operated by said means, an eccentric slidably keyed to said shaft and mounted on said member for movement therewith, and an adjustable operating connection between said eccentric and said clamping element.

4. A tailstock construction having in combination an upstanding column, a tailstock mounted for vertical sliding movement thereon, a clamping element mounted on the tailstock for vertical movement therewith, an eccentric mounted in said tailstock for vertical movement therewith, a vertical shaft rotatably mounted in said column and having a connection with said eccentric operable to rotate said eccentric in any vertical position of said tailstock, an operating member at the base of said column for rotating said shaft, and toggle means on said tailstock actuated by said eccentric and operable when the links thereof are moved into alinement to clamp said element.

5. In a machine tool having an elongated support a member mounted for longitudinal sliding movement along said support, a clamping element carried by said member for securing said member in adjusted position on said support, a toggle means on said member having an adjustable actuating connection with said clamping element, manipulative operating means positioned at one end of said support, a shaft rotatably mounted in said support parallel to the path of movement of said member and operated by said manipulative means, an eccentric slidably keyed to said shaft and mounted on said member for movement therewith, and an operating connection between said eccentric and said toggle means.

6. In a machine tool having a stationary support and a movable support slidable thereon, a clamping element on said movable support, a movable clamp rod on said movable support for clamping said element, toggle means acting at one end against a fixed abutment on said movable support, an adjustable abutment on said clamp rod against which the other end of said toggle means acts, and means for actuating said toggle means.

7. In a machine tool having a stationary support and a movable support slidable thereon, a clamping element on said movable support, a movable clamp rod on said movable support for clamping said element, two pairs of toggle links mounted one pair on each side of said rod and each pair acting at one end against a fixed abutment on said movable support, adjustable abutment means on said clamp rod against which the other end of each pair of said toggle links acts, and means for actuating all of said toggle links in unison.

8. In a machine tool having a stationary support and a movable support slidable thereon, a clamping element on said movable support, a movable clamp rod on said movable support for clamping said element, two pairs of toggle links mounted one pair on each side of said rod and each pair acting at one end against a fixed abutment on said movable support, adjustable abutment means on said clamp rod against which the other end of each pair of said toggle links acts, means connecting the corresponding links on opposite sides of the rod to each other, and means for actuating all of said toggle links in unison.

9. In a machine tool having a stationary support and a movable support slidable thereon, a clamping element on said movable support, a movable clamp rod on said movable support for clamping said element, a member having a bifurcated end providing spaced arms straddling said rod and mounted for shifting movement transversely of the rod, abutment means on said rod and on said support, two pairs of toggle links, one pair positioned on each side of said rod, with the links of each pair bearing in opposed relation against the opposite sides of the adjacent arm of said member, and the other ends of links bearing against the abutment means on the rod and the support respectively, and means for shifting said member to operate said toggles.

10. In a machine tool having a stationary support and a movable support slidable thereon, a clamping element on said movable support, a movable clamp rod on said movable support for clamping said element, a member having a bifurcated end providing spaced arms straddling said rod and mounted for shifting movement transversely of the rod, abutment means on said rod and on said support, two pairs of toggle links, one pair positioned on each side of said rod, with the links of each pair bearing in opposed relation against the opposite sides of the adjacent arm of said member, and the other ends of links bearing against the abutment means on the rod and the support respectively, and means for shifting said member to extend said toggles, and a spring to shift said rod to return said toggles from their extended relation.

11. In a machine tool having a stationary support and a movable support slidable thereon, a clamping element on said movable support, a movable clamp rod on said movable support for clamping said element, two pairs of toggle links one positioned on each side of said rod, abutments on said support and said rod against which said toggle links act, and means for actuating said toggle links in unison.

12. In a machine tool having a stationary support and a movable support slidable thereon, a clamping element on said movable support, a movable clamp rod on said movable support for clamping said element, two pairs of toggle links one positioned on each side of said rod, abutments on said support and said rod against which said toggle links act, means for actuating said toggle links in unison, and means for adjusting said toggle links.

13. In a machine tool having a stationary support and a movable support slidable thereon, a clamping element on said movable support, a movable clamp rod on said movable support for clamping said element, a longitudinally adjustable sleeve on one end of said rod, an abutment on said movable support in opposed spaced relation to one end of said sleeve between said sleeve and the other end of said rod, two pairs of toggle links positioned on opposite sides of said rod, seats formed in said abutment and said end of sleeve for the ends of said links, and means forming an actuating bearing for the adjacent ends of the links to extend the toggles.

14. In a machine tool having a base, a tailstock column slidable along the base, a head movable vertically along said column, a clamp on said head for securing the same in adjusted position on the column, a rotatable vertical shaft mounted in said column and operably connected to said clamp for actuating the same in any vertical position of the head, and an operating handle for rotating said shaft mounted on the column at its lower end for movement with the column as it is shifted on the base.

15. A machine tool having a base, a tailstock column mounted for shifting movement along the base, said column comprising two transversely spaced standards with cross members joining their upper and lower ends and having vertically extending opposed ways, a head mounted on said ways for vertical movement, a clamp for securing said head in adjusted position on the column, a vertically extending shaft positioned in the space between said standards and rotatably journaled at its upper and lower ends in said cross members, means forming a connection between said shaft and said clamp operable by rotation of said shaft to actuate said clamp, and a handle mounted on said column and operable to rotate said shaft.

16. A machine tool having an upstanding tailstock column with a vertically elongated central space dividing said column into two spaced standards joined at their upper ends, a head mounted for vertical adjustment in said space, a clamp on said head for securing the head in adjusted position on the column, a rotatable vertical shaft positioned in said space and suspended from the top of said column, a connection on said head operable by rotation of said shaft in any vertical position of the head to actuate said clamp, and means including an operating handle at the bottom of said column for rotating said shaft.

RAYMOND M. WOYTYCH.